United States Patent [19]

Takayanagi et al.

[11] 3,904,608

[45] Sept. 9, 1975

[54] PROCESS FOR THE PRODUCTION OF LACTAM

[75] Inventors: Kazuo Takayanagi; Takeshi Sonoda, both of Kamakura, Japan

[73] Assignee: Toray Industries, Inc., Muro, Japan

[22] Filed: Sept. 6, 1973

[21] Appl. No.: 394,714

[30] Foreign Application Priority Data

Sept. 8, 1972  Japan.............................. 47-89509

[52] U.S. Cl........................................ 260/239.3 A
[51] Int. Cl.² ...................................... C07D 201/04
[58] Field of Search............................ 260/239.3 A

[56] References Cited
UNITED STATES PATENTS 2,221,369  11/1940  Cass........................... 260/239.3 A
3,437,655  4/1969  Garritsen et al. ............ 260/239.3 A
3,687,938  8/1972  Masaki et al. ................ 260/239.3 A
3,700,656  10/1972  Masaki et al. ............... 260/239.3 A Primary Examiner—Norma S. Milestone
Assistant Examiner—Robert T. Bond
Attorney, Agent, or Firm—Waters, Schwartz & Nissen

[57] ABSTRACT

A process for producing lactam by Beckmann rearrangement of cycloalkanone oxime. A cycloalkanone oxime is contacted at an elevated temperature, with sulfate or phosphate of metal ions selected from manganese, ferrous, ferric, cobalt, nickel, zinc and cadmium in the presence of at least one mole of hydrogen chloride per mole of the cycloalkanone oxime. Lactam can be recovered from the reaction mixture without producing ammonium sulfate as a by-product.

16 Claims, No Drawings

PROCESS FOR THE PRODUCTION OF LACTAM

BACKGROUND OF THE INVENTION

This invention relates to a process for producing lactam by Beckmann rearrangement of a cycloalkanone oxime. More specifically, the invention relates to a process for producing lactam without byproduction of ammonium sulfate by Beckmann rearrangement using, as catalyst, a sulfate or a phosphate of selected metal ions and hydrogen chloride.

It has been well known in the field of the art that a cycloalkanone oxime can be converted to a corresponding lactam by Beckmann rearrangement using various kinds of catalyst. $\epsilon$-caprolactam, for example, has been commercially produced by Beckmann rearrangement of cyclohexanone oxime, wherein concentrated sulfuric acid has been used as catalyst. Although sulfuric acid is only one and the best catalyst usable in commercial production of $\epsilon$-caprolactam, the catalyst have a large defect that it inevitably produces one to two moles of ammonium sulfate per mole of lactam as by-products.

For this reason many attempts and proposals have been made to find a catalyst of Beckmann rearrangement which does not produce ammonium sulfate as a byproduct and has enough activity and selectivity to use in a commercial production of lactam. Heretofore, however, such a good catalyst has not been found and sulfuric acid has been used as only catalyst applicable to commercial production of $\epsilon$-caprolactam.

In Japanese patent publication sho 47-18114, for example, hydrogen chloride is used as catalyst for Beckmann rearrangement reaction. In such a method lactam was obtained in a form of hydrogen chloride salt, and lactam can be isolated by heat decomposition from the salt.

The Beckmann rearrangement catalized by hydrogen chloride, however, has not been applied to commercial production of lactam because the catalyst does not give a high yield of lactam. Some organic solvents can be added to the reaction system for improving the yield, but such solvents are often consumed during the rearrangement reaction, because they participate in a certain side reaction.

The present invention will solve the problems encountered by the prior arts in that the process of this invention gives lactam in high yield and without producing ammonium sulfate as a byproduct.

SUMMARY OF THE INVENTION

The inventors have found that a cycloalkanone oxime can be converted to a corresponding lactam in high yield by contacting it with a certain metal sulfate or phosphate in the presence of hydrogen chloride and at an elevated temperature.

The metal sulfate of phosphate, which used in the process of this invention, may be manganese sulfate, ferrous sulfate, ferric sulfate, cobalt sulfate, nickel sulfate, zinc sulfate, cadmium sulfate, manganese phosphate, ferrous phosphate, ferric phosphate, cobalt phosphate, nickel phosphate, zinc phosphate and cadmium phosphate. These sulfates or phosphates can be recovered from the reaction mixture, and again used in the following reaction. The amount of the metal sulfate or phosphate used in the process of this invention depends on whether the reaction is carried out in the presence of or in the absence of solvent, and what kind of solvent is used. When the reaction is carried out in a reaction vessel equipped with stirrer, 0.001 to 10 moles, preferably 0.1 to 2 moles, of metal sulfate or phosphate per mole of cycloalkanone oxime is used. When the reaction is carried out in fixed bed type reactor, the time factor of the reaction is in the range of 1 to 500, preferably 10 to 100 g.cat.hr/mol-oxime.

Thus the process of the present invention can be carried out, as a heterogeneous liquid phase reaction, in a reaction vessel equipped with stirrer or a tube reactor. It can be also carried out in a fixed bed type reactor wherein metal sulfate or phosphate is used in a shaped form.

The reaction temperature depends on the kind of cycloalkanone oxime or on the kind of solvent when it is used, generally speaking, however, it is 60° to 180°C preferably 80° to 150°C.

The reaction pressure is not specifically restricted. The reaction can be carried out under a reduced pressure, but preferable range of the reaction pressure is 1 to 100 and most preferably 1 to 10 atomsferic pressure. The reaction is usually carried out under an atmosphere containing hydrogen chloride. In the process of the present invention an inert organic solvent is preferably used as reaction medium to remove reaction heat. The kind of solvent is not specified and any inert solvent under the reaction condition of this invention can be used. For example, parafinic or cycloparafinic hydrocarbon; aromatic hydrocarbons such as benzene, toluene and xylene; halogenated hydrocarbons such as chloroform, 1,2-dichloroethane, 1,2-dichloropropane, 1,1,2-trichloroethane, trichloroethylene, 1,1,2,2-tetrachloroethane, chlorocyclohexane, chlorobenzene, bromobenzene and dichlorobenzene; nitro compounds such as nitrobenzene and nitrotoluene; dioxane, ortho-chlorophenol and $\epsilon$-caprolactam etc. The amount of solvent is usually less than 20, preferably 1 to 5, parts by weight per 1 part of cycloalkanone oxime.

The cycloalkanone oxime, which can be converted according to the process of this invention, has 6 to 12 carbon atoms in its ring. For example, cyclohexanone oxime, cyclooctanone oxime, cyclododecanone oxime, their alkyl or phenyl substituted derivatives, and their amino derivatives such as 2-aminocyclohexanone oxime.

Such an oxime can be fed to the process of this invention in a form of hydrogen chloride salt. When oxime is fed in isolated form, hydrogen chloride should be charged to reaction system. At least one mole of hydrogen chloride per mole of oxime should exist in the reaction zone. The amount of hydrogen chloride is preferably more than 1.5, more preferably more than 1.8 mole per mole of oxime.

Hydrogen chloride salt of lactam obtained in the process of this invention can be decomposed by heating and hydrogen chloride and lactam can be separately recovered without neutralizing reaction mixture. According to this invention, therefore, lactam can be produced in high yield without producing large amount of byproduct such as ammonium sulfate obtained in Beckmann rearrangement using sulfuric acid catalyst.

The invention will be more clearly understood by reference to following examples which are not intended to limit.

EXAMPLE 1

In four "Pyrex" ampoule tubes with a capacity of about 20 ml, 1.0 g of cyclohexanone oxime is mixed with 5 g of nitrobenzene, after which gaseous hydrogen chloride is introduced 0, 1.0, 2.0 and 3.8 moles of hydrogen chloride per mole of oxime respectively, and then 1.42 g (equimolecular amount with respect to the oxime) of zinc sulfate which was calcined at 600°C are added and sealed respectively.

Subsequently the temperature is raised and kept at 100°C for 30 minutes in an incubator. These reaction products are dissolved in methanol and neutralized with potassium-hydroxide.

These solutions are quantitatively analyzed with a gas chromatograph.

The results obtained are shown in Table 1.

Table 1

| Hcl/Oxime (mole/mole) | Oxime recovery* (%) | Lactam yield** (%) |
|---|---|---|
| 0 | 93 | 0 |
| 1.0 | 0 | 21 |
| 2.0 | 0 | 94 |
| 3.8 | 0 | 93 |

$$\text{*Oxime recovery }(\%) = \frac{\text{cyclohexanone oxime in product(g)}}{\text{used cyclohexanone oxime(g)}} \times 100$$

$$\text{**Lactame yield }(\%) = \frac{\epsilon\text{-caprolactam in product(g)}}{\text{used cyclohexanone oxime(g)}} \times 100$$

EXAMPLE 2

Similar reactions as described in Example 1 are carried out with 1.71 g (0.5 mole per mole of oxime) of zinc phosphate which was calcined at 300°C instead of zinc sulfate, and with a reaction temperature of 100°C for 2 hours.

The results obtained are shown in Table 2.

Table 2

| Hcl/oxime (mole/mole) | Oxime recover (%) | Lactam yield (%) |
|---|---|---|
| 0 | 92 | 0 |
| 1.0 | 4 | 25 |
| 2.0 | 2 | 91 |
| 3.8 | 0 | 92 |

EXAMPLE 3

In eight ampoules as described in Example 1, 1.0 g of cyclohexanone oxime and 5 g of 1,2-dichloroethane and 2.0 moles of hydrogen chloride per mole of oxime are added respectively. Next, equimolecular amount (with respect to the oxime) of manganese sulfate, ferrous sulfate, ferric sulfate, cobalt, sulfate, nickel sulfate, zinc sulfate and cadmium sulfate which were calcined at 300°C are added and sealed respectively.

As a comparative example, an ampoule is sealed without catalyst.

Subsequently the temperature is raised and kept at 90°C for 2 hours in a incubator. The results obtained are shown in Table 3.

Table 3

| Catalyst | Oxime recovery (%) | Lactam yield (%) |
|---|---|---|
| $MnSO_4$ | 2 | 87 |
| $FeSO_4$ | 6 | 75 |
| $Fe_2(SO_4)_3$ | 0 | 92 |
| $CoSO_4$ | 0 | 89 |
| $NiSO_4$ | 17 | 68 |
| $ZnSO_4$ | 0 | 93 |
| $CdSO_4$ | 1 | 86 |
| — | 95 | 1 |

EXAMPLE 4

Similar reactions as described in Example 3 are carried out with metal phosphate instead of metal sulfate, and 1,1,2,2-tetrachloroethane instead of 1,2-dichloroethane, and with a reaction temperature of 100°C for 2 hours.

The results obtained are shown in Table 4.

Table 4

| Catalyst | Oxime recovery (%) | Lactam yield (%) |
|---|---|---|
| $MnHPO_4$ | 8 | 75 |
| $Fe_3(PO_4)_2$ | 13 | 71 |
| $FePO_4$ | 0 | 86 |
| $Co_3(PO_4)_2$ | 0 | 90 |
| $Ni_3(PO_4)_2$ | 25 | 61 |
| $Zn_3(PO_4)_2$ | 0 | 92 |
| $Cd_3(PO_4)_2$ | 3 | 83 |
| — | 95 | 1 |

EXAMPLE 5

Similar reaction as described in Example 1 is carried out with 2.0 moles of hydrogen chloride per mole of oxime, and with 0.43 g (0.3 mole per mole of oxime) of zinc sulfate, and with a reaction temperature of 110°C for 30 minutes. The yield of ε-caprolactam obtained in 88%, and there is no cyclohexanone oxime in the product.

EXAMPLE 6

Similar reactions as described in Example 2 are carried out with 1.42 g of zinc sulfate as catalyst, and with 3.0 g chloroform, m-xylene and o-dichlorobenzene as solvent respectively.

The yields of ε-caprolactam obtained are 88%, 76% and 84% respectively.

EXAMPLE 7

The experiments described in Example 6 are repeated, instead of zinc sulfate, 3.42 g (equimolecular amount with respect to the oxime) of zinc phosphate is used, and that the reaction temperature is maintained at 110°C for one hour.

The yields of ε-caprolactam obtained are 87%, 81% and 85% respectively.

EXAMPLE 8

In a 300 ml reaction vessel equipped with a stirrer and a calcium chloride tube, 50 g of cyclohexanone oxime hydrochloride oil (consisting of 0.269 mole of oxime and 0.537 mole of hydrogen chloride) and 20 g of zinc sulfate are mixed with 100 g of nitrobenzene. Subsequently the temperature is raised and kept at 100°C for one hour. The yield of ε-caprolactam obtained is 91%, and there is no cyclohexanone oxime in the product.

EXAMPLE 9

The experiment described in Example 8 is repeated, instead of zinc sulfate, 30 g of zinc phosphate is used, and that the reaction temperature is maintained at 100°C for 2 hours. The yield of ε-caprolactam obtained is 91%, and there is no cyclohexanone oxime in the product.

EXAMPLE 10

Similar reactions as described in Example 3 are carried out with 1.74 g of cyclododecanone oxime, and with 1.42 g of zinc sulfate and 1.36 g of cobalt sulfate as catalyst respectively. The yields of ω-laurolactam obtained are 94% and 92% respectively.

EXAMPLE 11

The experiment described in Example 10 is repeated, instead of metal sulfates, 1.71 g of zinc phosphate is used, and that the reaction temperature is maintained at 100°C for 2 hours. The yield of ω-laurolactam obtained is 92%.

What is claimed is:

1. A process for production of lactam in high yields which comprises contacting, in a liquid phase and at a temperature of about 60° to 180°C., a cycloalkanone oxime having 6 to 12 carbon atoms in its ring with at least one metal salt selected from the group consisting of manganese sulfate, ferrous sulfate, ferric sulfate, cobalt sulfate, nickel sulfate, zinc sulfate, cadmium sulfate, manganese phosphate, ferrous phosphate, ferric phosphate, cobalt phosphate, nickel phosphate, zinc phosphate and cadmium phosphate in the presence of at least one mole of hydrogen chloride per mole of the cycloalkanone oxime, thereby said cycloalkanone oxime being subjected to Beckmann rearrangement to lactam.

2. The process as claimed in claim 1 further characterized in that the metal salt is manganese sulfate.

3. The process as claimed in claim 1 further characterized in that the metal salt is ferrous sulfate.

4. The process as claimed in claim 1 further characterized in that the metal salt is ferric sulfate.

5. The process as claimed in claim 1 further characterized in that the metal salt is cobalt sulfate.

6. The process as claimed in claim 1 further characterized in that the metal salt is nickel sulfate.

7. The process as claimed in claim 1 further characterized in that the metal salt is zinc sulfate.

8. The process as claimed in claim 1 further characterized in that the metal salt is cadmium sulfate.

9. The process as claimed in claim 1 further characterized in that the metal salt is manganese phosphate.

10. The process as claimed in claim 1 further characterized in that the metal salt is ferrous phosphate.

11. The process as claimed in claim 1 further characterized in that the metal salt is ferric phosphate.

12. The process as claimed in claim 1 further characterized in that the metal salt is cobalt phosphate.

13. The process as claimed in claim 1 further characterized in that the metal salt is nickel phosphate.

14. The process as claimed in claim 1 further characterized in that the metal salt is zinc phosphate.

15. The process as claimed in claim 1 further characterized in that the metal salt is cadmium phosphate.

16. The process as claimed in claim 1 further characterized in that the reaction is carried out in an inert organic solvent.

* * * * *